(12) United States Patent
Lorenzo Pellico

(10) Patent No.: US 11,939,763 B2
(45) Date of Patent: Mar. 26, 2024

(54) ROBOTISED CONSTRUCTION SYSTEM

(71) Applicant: EVOLUTION CONSTRUCTION SYSTEM, S.L., Las Palmas (ES)

(72) Inventor: Daniel Lorenzo Pellico, Las Palmas (ES)

(73) Assignee: EVOLUTION CONSTRUCTION SYSTEM, S.L., Las Palmas (ES)

( * ) Notice: Subject to any disclaimer, the term of this patent is extended or adjusted under 35 U.S.C. 154(b) by 791 days.

(21) Appl. No.: 17/046,348

(22) PCT Filed: Apr. 10, 2019

(86) PCT No.: PCT/ES2019/070247
§ 371 (c)(1),
(2) Date: Oct. 9, 2020

(87) PCT Pub. No.: WO2019/197698
PCT Pub. Date: Oct. 17, 2019

(65) Prior Publication Data
US 2021/0164218 A1  Jun. 3, 2021

(30) Foreign Application Priority Data
Apr. 10, 2018 (ES) ............... ES201830358

(51) Int. Cl.
*B05B 13/04* (2006.01)
*B25J 9/02* (2006.01)
(Continued)

(52) U.S. Cl.
CPC .......... *E04B 1/3505* (2013.01); *B05B 13/041* (2013.01); *B05B 13/0431* (2013.01);
(Continued)

(58) Field of Classification Search
CPC . E04B 1/3505; E04B 1/16; E04B 1/35; B05B 13/041; B05B 13/0431; B25J 9/026;
(Continued)

(56) References Cited

U.S. PATENT DOCUMENTS 8,337,736 B2 * 12/2012 Dini ................... B28B 7/465
264/33
8,568,121 B2 * 10/2013 Khoshnevis ............ B28B 3/20
425/63
(Continued)

FOREIGN PATENT DOCUMENTS

WO  2005097476 A2  10/2005
WO  2009037550 A2  3/2009
(Continued)

OTHER PUBLICATIONS

Int'l. Search Report for PCT/ES2019/070247, dated Jul. 29, 2019.

*Primary Examiner* — Frederick C Nicolas
(74) *Attorney, Agent, or Firm* — MaxGoLaw PLLC

(57) ABSTRACT

A robotised construction system is provided that includes a cartesian robot that can be automatically lifted as the construction is becoming higher, that is provided with a system of robotic supply of the materials and of the electric and electronic installations and that is provided with specific fabrication tools which work some by the contribution of layers of fluid construction materials. In a cement-based usage in which the cement is setting and having been deposited, by projection of these same materials and others by forming and placing construction elements in a determined position.

18 Claims, 13 Drawing Sheets

(51) Int. Cl.
  *B25J 11/00* (2006.01)
  *B28B 1/00* (2006.01)
  *B28B 11/08* (2006.01)
  *B29C 64/106* (2017.01)
  *B29C 64/20* (2017.01)
  *B29C 64/227* (2017.01)
  *B33Y 10/00* (2015.01)
  *B33Y 30/00* (2015.01)
  *B33Y 80/00* (2015.01)
  *E04B 1/16* (2006.01)
  *E04B 1/35* (2006.01)
  *E04F 21/08* (2006.01)
  *E04G 21/04* (2006.01)

(52) U.S. Cl.
  CPC .............. *B25J 9/02* (2013.01); *B25J 9/026* (2013.01); *B25J 11/0075* (2013.01); *B28B 1/00* (2013.01); *B28B 1/001* (2013.01); *B28B 11/0845* (2013.01); *B29C 64/106* (2017.08); *B29C 64/20* (2017.08); *B29C 64/227* (2017.08); *B33Y 10/00* (2014.12); *B33Y 30/00* (2014.12); *B33Y 80/00* (2014.12); *E04B 1/16* (2013.01); *E04B 1/35* (2013.01); *E04F 21/08* (2013.01); *E04G 21/04* (2013.01); *E04G 21/0418* (2013.01); *E04G 21/0427* (2013.01); *E04G 21/0463* (2013.01)

(58) Field of Classification Search
  CPC ......... B25J 11/0075; B25J 9/02; B28B 1/001; B28B 11/0845; B28B 1/00; B29C 64/227; B29C 64/106; B29C 64/20; B33Y 30/00; B33Y 10/00; B33Y 80/00; E04G 21/04; E04G 21/0427; E04G 21/0418; E04G 21/0463; E04F 21/08
  See application file for complete search history.

(56) References Cited

U.S. PATENT DOCUMENTS

| | | | |
|---|---|---|---|
| 8,944,799 B2* | 2/2015 | Khoshnevis | B28B 17/0072 425/169 |
| 9,206,601 B2* | 12/2015 | Khoshnevis | B29C 48/21 |
| 10,301,814 B2* | 5/2019 | Khoshnevis | E04B 1/3505 |
| 2018/0095450 A1* | 4/2018 | Lappas | G06T 19/00 |

FOREIGN PATENT DOCUMENTS

| | | |
|---|---|---|
| WO | 2009055580 A2 | 4/2009 |
| WO | 2016166116 A1 | 10/2016 |
| WO | 2017222599 A1 | 12/2017 |
| WO | 2018193088 A1 | 10/2018 |

* cited by examiner

ROBOTISED CONSTRUCTION SYSTEM

OBJECT OF THE INVENTION

The object of this invention is a system that allows erecting any construction, such as, inter alias, buildings, structures, infrastructures, by means of a cartesian robot with robotic supply of liquid construction materials that, when setting, form the vertical and horizontal elements that form a construction, as well as the electric and electronic installations necessary for moving the robot. As a noteworthy characteristic of the invention there is the possibility that the cartesian robot autonomously rises, being fastened on the vertical surfaces of the construction, without foreign lifting elements such as cranes are required.

BACKGROUND OF THE INVENTION

Construction is an activity with an intense requirement of workforce, which implies that it is a sector having scarce productivity and high risk of accidents at work derived from the manual nature of many of the jobs carried out. However, the machinery plays a very important part, being essential in a large portion of the tasks and in the safety with which they are carried out.

Among the machinery used, it can be noted that used for lifting materials, for levelling, for preparing and pouring mortars and concretes.

Another of the elements that improves its productivity is the precast construction materials, such as the precast concrete elements and facing plates. The precast concrete elements include many products made at the factory by molding and setting, such as large structural prefabricated elements, such as beams, walls and pillars, small structural prefabricated elements, such as the joists, concrete tubes, blocks, curbs, paving stones, as well as special prefabricated elements among which namely sleepers, posts and cabins. But until now, no system has been developed, or at least of which the applicant is aware, that drastically reduces human participation in the construction tasks.

This invention preconizes an automated system that, by using a cartesian robot that rises above the construction, autonomously, as the construction is becoming higher and by the contribution of liquid construction materials, allows erecting almost any type of structure.

EXPLANATION OF THE INVENTION

The robotised construction system, that is the object of this invention, comprises:
A cartesian robot, that in turn comprises:
  Two horizontal beams so that at least part of the story of the construction is located between the said beams,
  One or more bridge beams arranged between the horizontal beams and designed to move along the said horizontal beams,
  One or more carts arranged on each of the said bridge beams and designed to move along the said bridge beams,
  One or more extendible columns, each of the said extendible columns is coupled to one of the said carts,
  One or more overhanging arms, each of the said overhanging arms is provided with one or more degrees of freedom and is coupled to the column free end,
  A plurality of actuators that move the bridge beams, the carts, the overhanging arms and extend or retract the extendible columns,
  A plurality of position sensors of the bridge beams, the carts and the overhanging arms,
  A programmable controller that at least controls the actuators and receives data from at least the position sensors;
One or more fabrication tools, arranged on the overhanging arms, of the vertical and horizontal elements that form a part of a building or other type of construction;
A device of electric and electronic supply driven by the said controller;
A device of simultaneous supply of one or more fluid construction materials, water and pressurized air, to the fabrication tools.

PREFERRED EMBODIMENT OF THE INVENTION

The robotised construction system comprises a cartesian robot (1), one or more fabrication tools (3), an electric supply device (4) and a construction material supply device (5).

Figure 1:
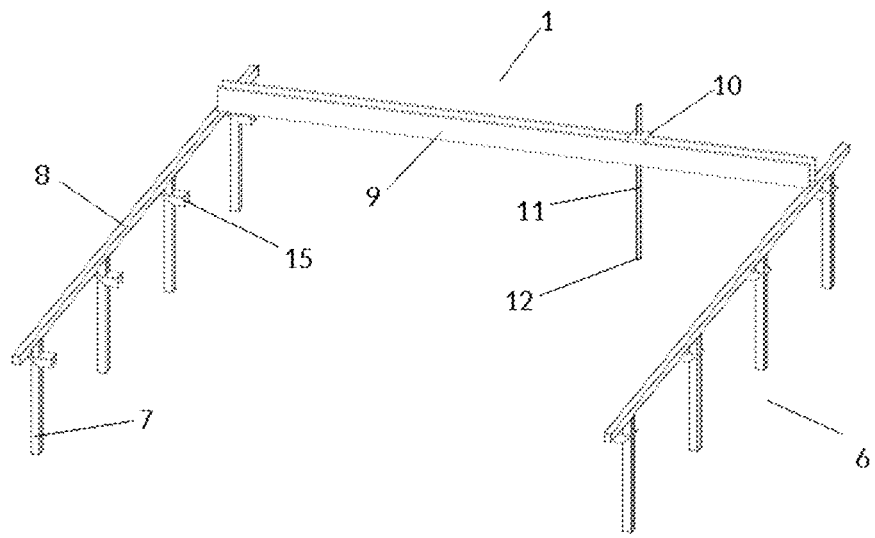
FIG. 1: It shows a perspective view of the cartesian robot.
Figure 2:
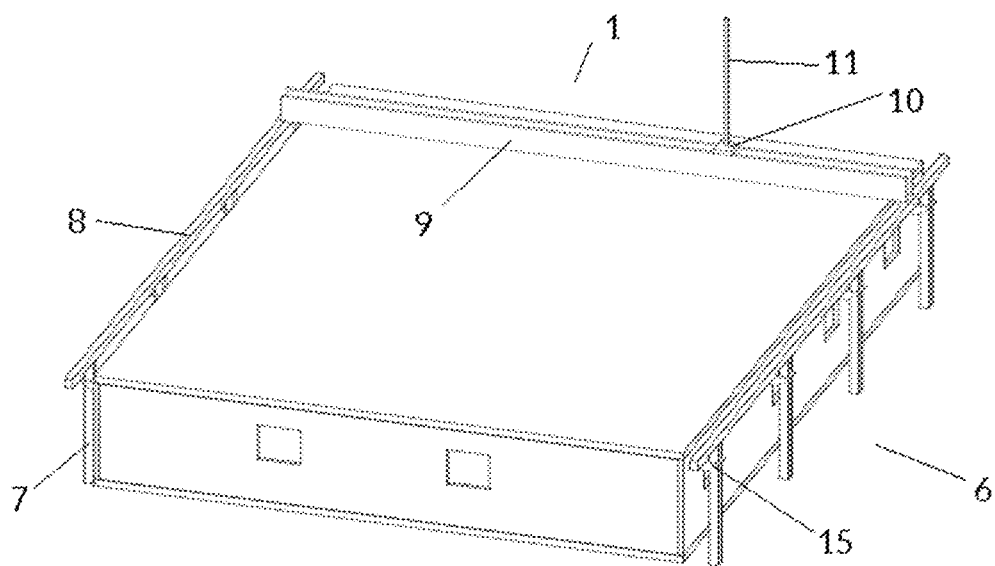
FIG. 2: It shows a perspective view of the cartesian robot when a story of a building has been built and the lifting device is anchored on the ceiling of the said story.
Figure 3:
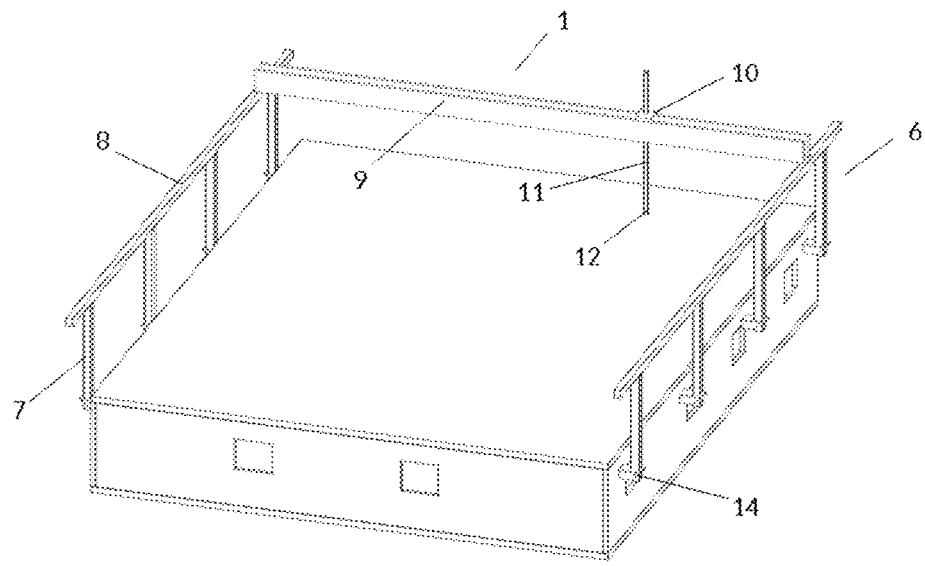
FIG. 3: It shows a perspective view of the cartesian robot risen above the already built story.
Figure 4:
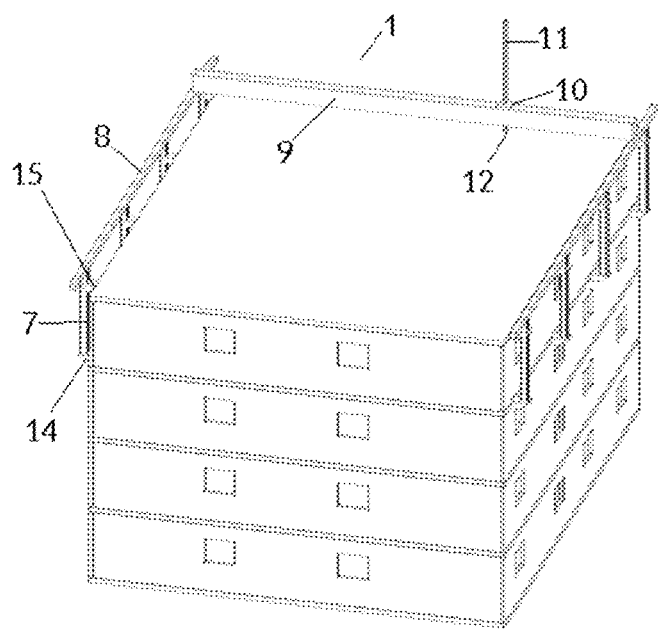
FIG. 4: It shows a perspective view of a four-story building and the cartesian robot anchored on the ceiling of the third story.
Figure 8:
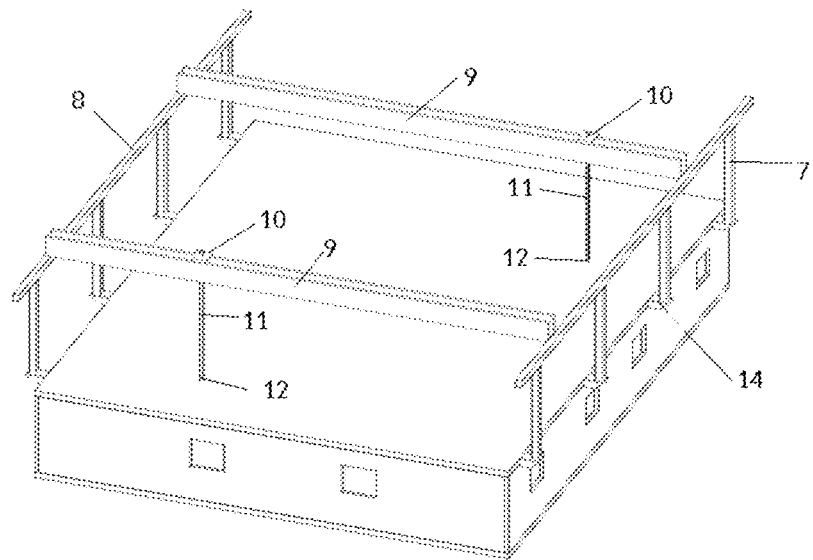
FIG. 8: It shows a perspective view of the cartesian robot with two bridge beams.
Figure 9:
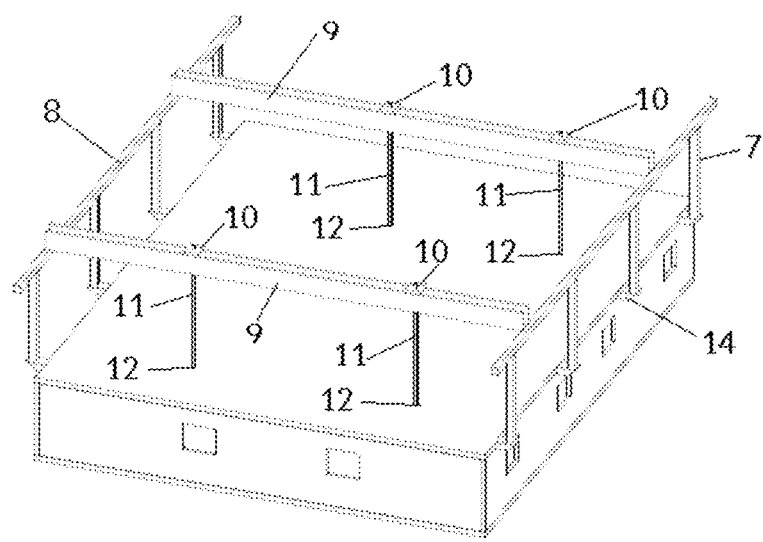
FIG. 9: It shows a perspective view of the cartesian robot with two bridge beams and two carts on each of the bridge beams.
Figure 10:
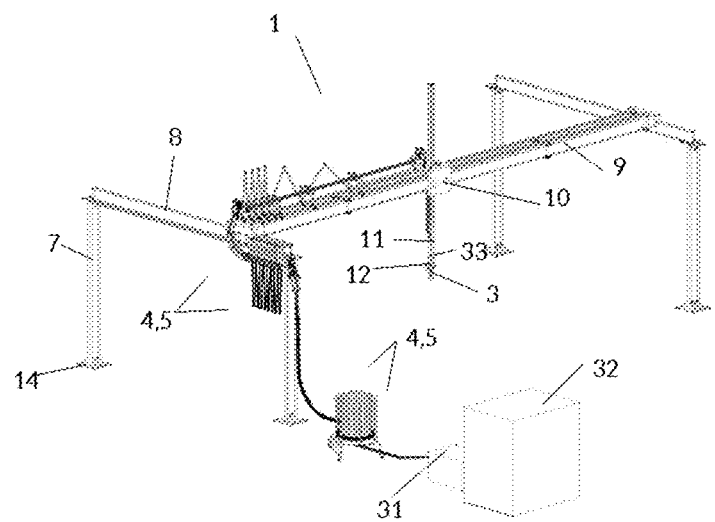
FIG. 10: It shows a perspective view of the whole of the robotic supply system of pipes for material and for electric and electronic cables of the invention.
Figure 11:
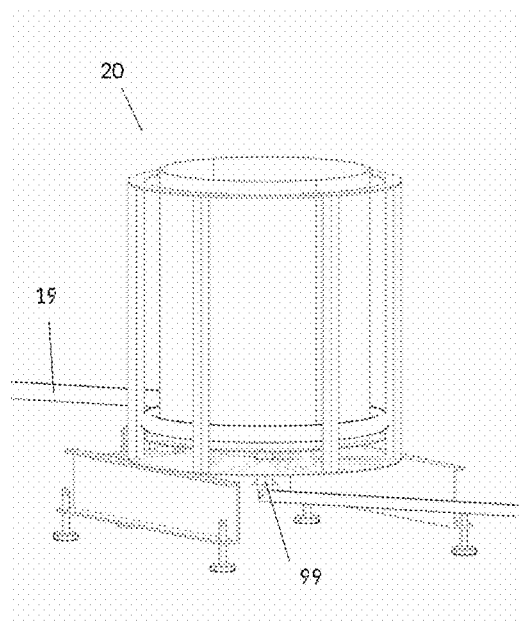
FIG. 11: It shows a view of the robotic rotating drum used in the robotic supply system where the pipes are coiled in the form of a spiral.

The cartesian robot comprises two beams (8), occasionally complemented by columns (7) forming porticos (6), in the FIGS. 1, 8 and 9, a preferred embodiment is shown with four columns and a horizontal beam (8), where the beams can be extendible to fit constructions having a different length. One or more bridge beams (9), that also can be extendible to modify their width in the event that the beams (8) are not parallel to each other, that are arranged between the horizontal beams (8) and on them, one or more carts (10) are arranged, in the FIG. 1 only one bridge beam (9) is shown with a cart (10), in the FIG. 8, the cartesian robot (1) is shown with two bridge beams (9) and a single cart (10) on each one of them and in the FIG. 9 is shown a cartesian robot (1) with two bridge beams (9) and two carts (10) on each of the bridge beam (9). These last two preferred embodiments increase the speed of the construction because the controller avoids that the carts interfere to each other.

Preferably, the construction system comprises a system (2) for lifting beams (8) or porticos (6).

On the free end of each of the extendible columns (11), each extendible column is coupled to a cart, an overhanging arm (12) can be arranged and controlled by the controller of the cartesian robot that is provided with one or more degrees of freedom, for example the overhanging arm (12) can rotate with respect to a vertical axis and/or with respect to an horizontal axis in order to locate the fabrication tool (3) more accurately or to locate it perpendicularly with respect to the extendible column, for example to apply an adhesive or an insulator on a vertical or inclined surface.

Figure 5:
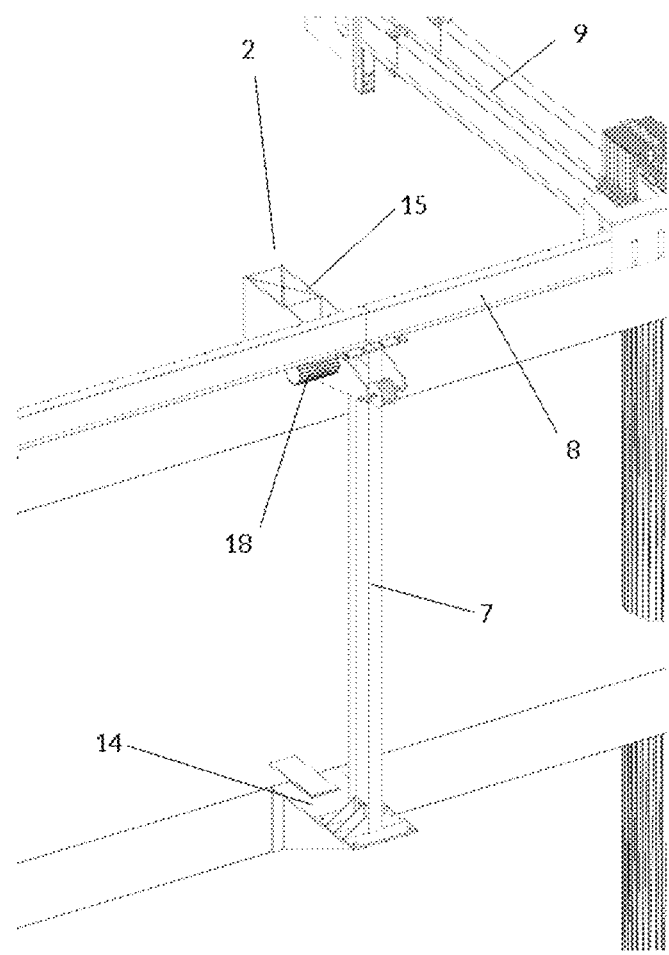
FIG. 5: It shows a perspective view of a detail of the cartesian robot ready to start rising.
Figure 6:
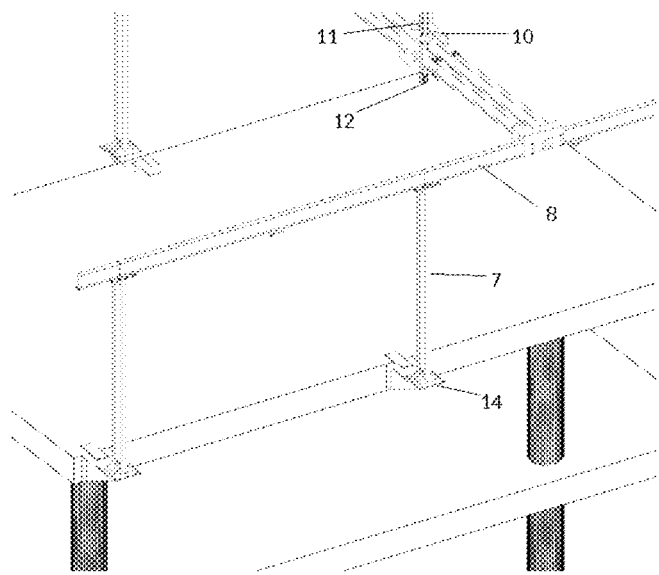
FIG. 6: It shows a perspective view of a detail of the cartesian robot fully risen to build a new story.
Figure 7:
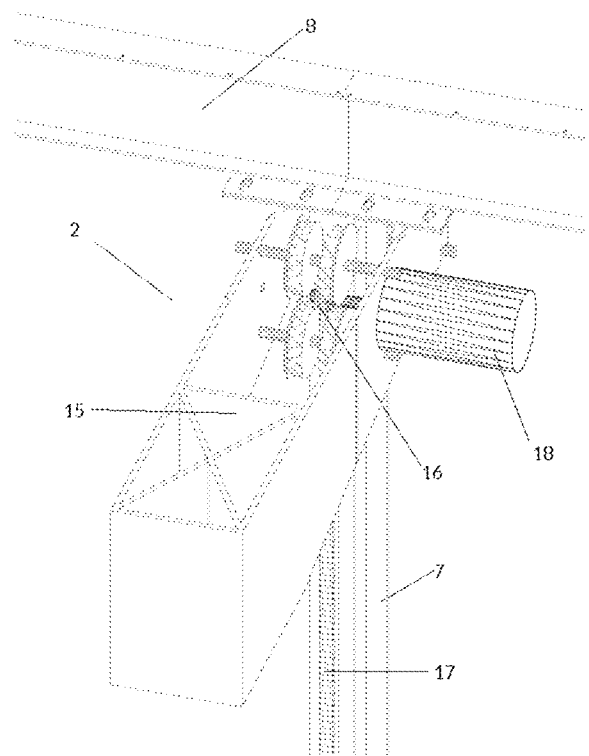
FIG. 7: It shows a perspective view of a detail of rack pinion type lifting device.

The FIGS. 1-7 show how the cartesian robot (1) rises as the construction goes on, in this case of a five-story building. The anchorages are divided into first anchorages (14) integral with the lower end of the columns (7) and on which the porticos (6) are supported when the robotised construction system is working and second anchorages (15), mobile along the columns (7), that are fixed on the construction only when they have to lift the cartesian robot (1) and that form a part of the lifting device (2), for example in the event that a rack pinion type lifting device, the pinions (16) and the motors (18) that drive them would be mounted on the second anchorages and the rack (17) would be located on the columns (7). The FIG. 1 shows the cartesian robot (1) supported on the ground on the first anchorages (14) and the second anchorages (15) of the lifting system (2) located at the upper part of the columns, in the FIG. 2, the first story is already built and the second anchorages (15) are supported on the ground of the first story or on the surface of the building or construction and by means of the lifting device (2) it lifts the two porticos (6) simultaneously, leaving the invention in its working position to build a new story, see FIG. 3, when the first anchorages (14) are anchored on the structure. The FIG. 5 shows how the porticos (6) are supported on the first (14) and on the second anchorages (15) once the fourth story is finished and ready to lift the robotised construction system to start the erection of the fifth story.

The lifting device (2) can be of the rack pinion type, driven by electric motors (18), by means of hydraulic or pneumatic piston that drives a ratchet wrench, of hydraulic cylinders, by means of mechanically operated threaded spindles or similar systems, all the types of lifting devices will be controlled and driven by the controller of the cartesian robot. Another possible lifting device (2) is by means of extendible columns (7), so that as the porticos are rising, the columns (7) are supported on lower columns as an extension of the columns of the portico (7) down the ground.

Figure 12:
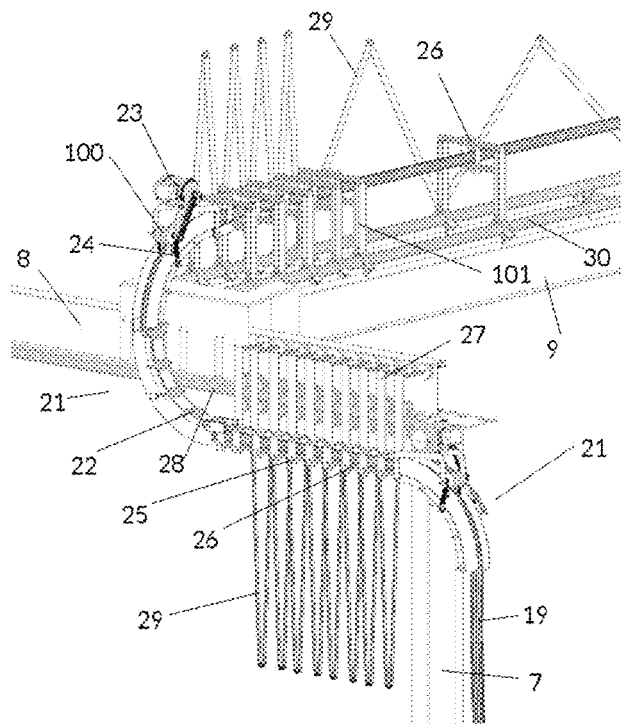
FIG. 12: It shows a view of the curved and power-driven devices as well as the supports of rotating bearings through which the pipes are guided.
Figure 13:
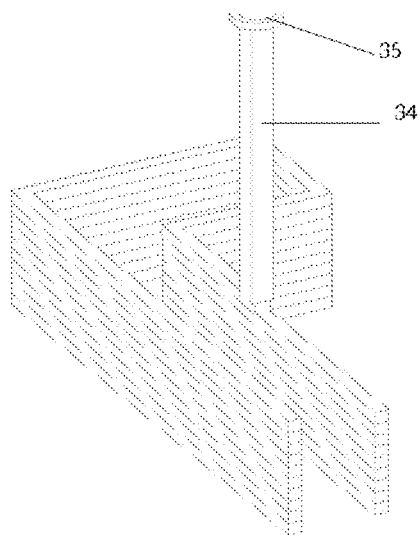
FIG. 13: It shows a perspective view of a nozzle having a square section and of an example of a vertical element in the process of construction.

On the other hand, the supplying device (4 and 5) can be provided with one or more pipes (19), one or more pipes for fluid construction materials, for example, cement-based, one or more for auxiliary materials for acoustic or thermal coatings and two or more for water and compressed air and one or more pipes for the robot power supply, the pipes (19) supplying construction materials (5) hydraulically join a storage tank and fluid pumping with the fabrication tools (3). The supplying device as a whole (4 and 5) and in a preferred construction, is formed by flexible elements and comprises one or more auxiliary motor-driven drums (20) and are controlled by the controller of the robot with movement simultaneously to it, where the flexible elements are coiled in a spiral, the different pipes (19) can be coiled all of them in one or more drums (20) or in one or more drums (20) dedicated only to one pipe (19). The pipes (19) go out of the drum (20) and go by one of the extendible columns (7) up to the horizontal beam (8), the transition of its vertical arrangement to horizontal is carried out by means of a curved and motor-driven device (21), that pushes the pipe (19) towards the drum (20) or towards the fabrication tool (3) depending on the movement of the whole robot this way, rubbing is avoided and it is guaranteed that the minimum bending radii of each of the different pipes (19) are met. The curved device (21) is provided with free rotating bearings (22) and a roller (100) coupled to the motor (23) and that by means of springs (24) compresses the pipes (19) in order to let them move controlled and simultaneously to the rotation of the drum (20). As the pipes (19) flow by the horizontal beam (8) they do it by the internal part of supports (25) with rotating bearings (26) on independent carts (27) that slide on rails (28) installed in the horizontal beams (8). They go apart at a determined maximum distance determined according to the type of canalization (19) and thanks to the use of a telescopic system or a scissor (29) as that appearing in the FIG. 12. The first cart (27) is anchored to the cart that moves the bridge beam (9) and the rest is anchored to each other so that they open it is being required. The transition of the pipes (19) between the horizontal beam (8) and the bridge beam (9) is carried out by means of a curved and motor-driven device (21) similar to that disclosed in the preceding paragraph and the pipes (19) flow by the bridge beam (9) by the internal part of supports having rotating bearings (26) on independent carts (101) that slide on rails (30) and taken apart at a determined maximum distance according to the type of canalization (19) and thanks to the use of a telescopic system or a scissor (29) similar to the precedingly disclosed up to a transition to the extendible column (11) by means of a curved and motor-driven device (21) similar to the preceding ones. The motorizations of the curved and power-driven devices (21) and of the drums (20) are synchronized by the controller and release a determined length of pipe (19) based on the position of the tip of the axis Z or tool (3).

The system of pipes (4 and 5) previously disclosed is also used by the power supply cables of supply of the different actuators and electric motors of the invention.

Obviously, the supply system (4 and 5) is provided with fast connections (99) between the rigid and the flexible elements, on/off valves and at least a main pump (31) at the exit of the tank of making construction materials (32) and at least with secondary pump (33) at the entrance of the fabrication tools (3), that can be of the type of an helical screw or a double drive piston pump, at the exit of the secondary pump (33) a suction valve can be provided to remove the air from the pipes and of flow sensors on all the preceding elements controlled by the said controller of the robot.

A variant of the supply system (4 and 5) comprises that the pipes are guided by cable hanger chains and pipes that are supported on the upper part of the beams (8) and of the bridge beam (9) and are anchored, in turn, on the carts that allow the movement as well of the bridge beam (9) as of the extendible column (11). This way, guiding the pipes (9) will be not controlled by the said controller of the robot.

A variant of the supply system (4 and 5) of the pipes (19) of the construction materials (5) comprises one or more unmanned aerial vehicles, ordinarily named drones, provided with one or more tanks of construction material, that fly up to the upper part of the extendible column (11) and inject the construction material among others, directly up to the tools (3) and/or up to the related primary (31) and secondary pumps (33) and/or on/off valves, the drones will be controlled by the controller that will be provided, in this case, with wireless communication means with the drone.

With relation to the fabrication tools (3) of the vertical and horizontal elements of the construction, four types of tools are designed: for depositing, for molding and for placing, for projection and finishing and handling.

The first type of fabrication tool (3) comprises one or more nozzles coupled to the overhanging arm (12) hydraulically and electrically connected to the supplying device (4 and 5) and designed to depositing layers of a fluid construction material that, when setting generate the said vertical or horizontal elements, at least one of the nozzles (34) can have a rectangular section and can be the unique nozzle of the fabrication tool (3), the said nozzles can be provided with an on/off valve (35) driven by the controller and even with an independent pumping system for each of them for perfectly dosing the material. The nozzles can be provided with a lateral plate with angular movement by means of a motor that allows to give support to the material deposited and/or give a shape, predetermined by the roughness of the lateral plate, to the material once it has been deposited.

Figure 14:
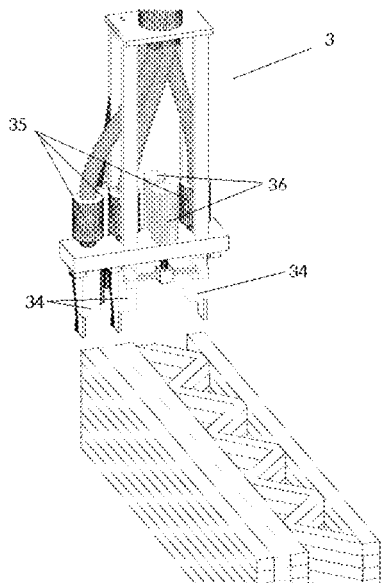
FIG. 14: It shows a perspective view of a fabrication tool having 5 nozzles, one of them mobile and the built vertical element.
Figure 15:
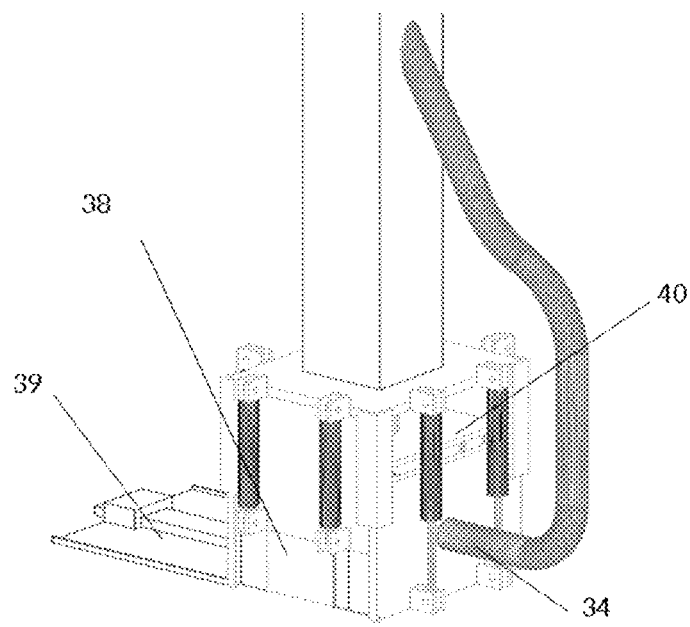
FIG. 15: It shows a perspective view of a fabrication tool having a mold arranged on a nozzle free end.
Figure 16:
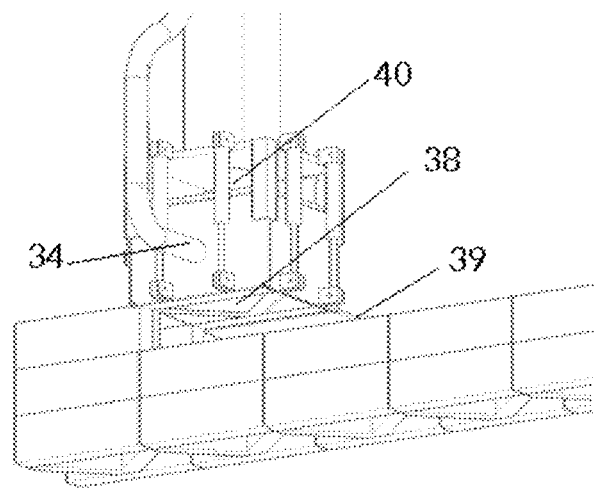
FIG. 16: It shows a perspective view of a vertical element built by means of elements made by means of the mold of the FIG. 15
FIG. 17: It shows a perspective view of the mold with its lower face open and depositing a solid construction element.
Figure 17:
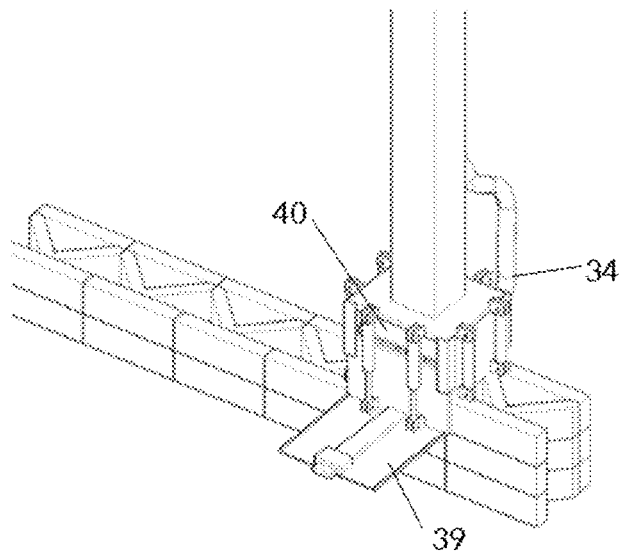
Figure 18:
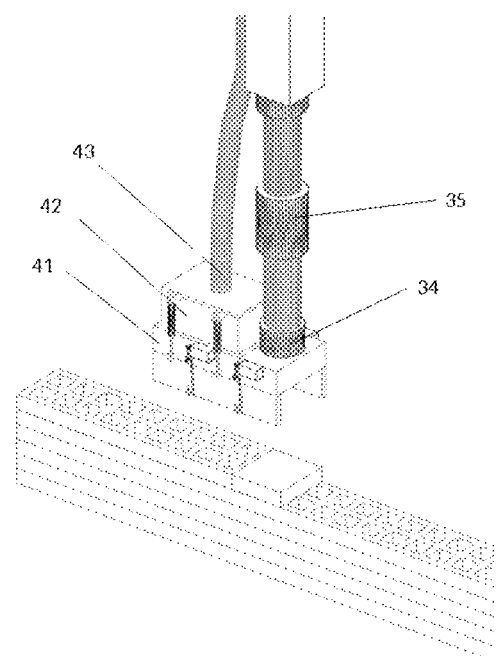
FIG. 18: It shows a perspective view of a fabrication tool by molding and vacuum.
Figure 19:
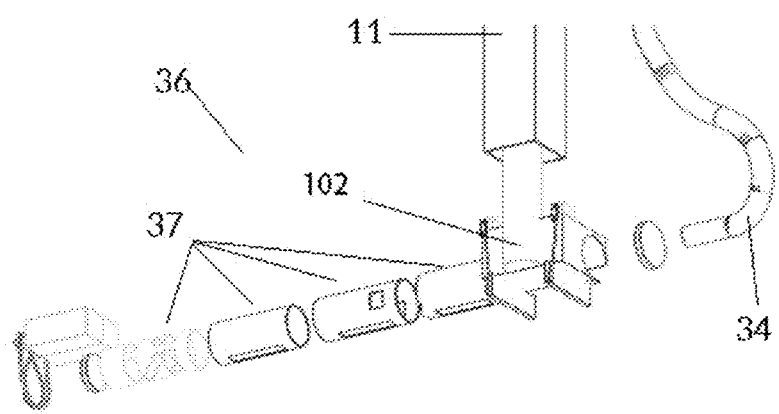
FIG. 19: It shows an exploded perspective view of the fabrication tool for depositing layers in printing roller format.
Figure 20:
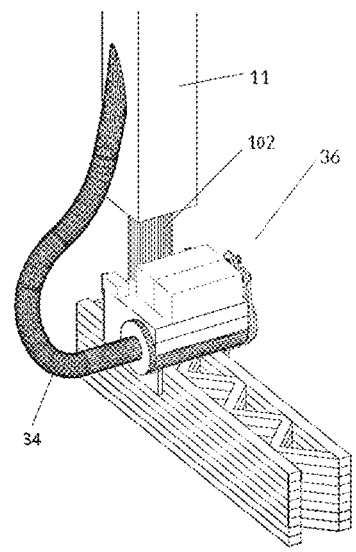
FIG. 20: It shows a perspective view of the tool of the FIG. 19 forming a construction element such as a wall.
Figure 21:
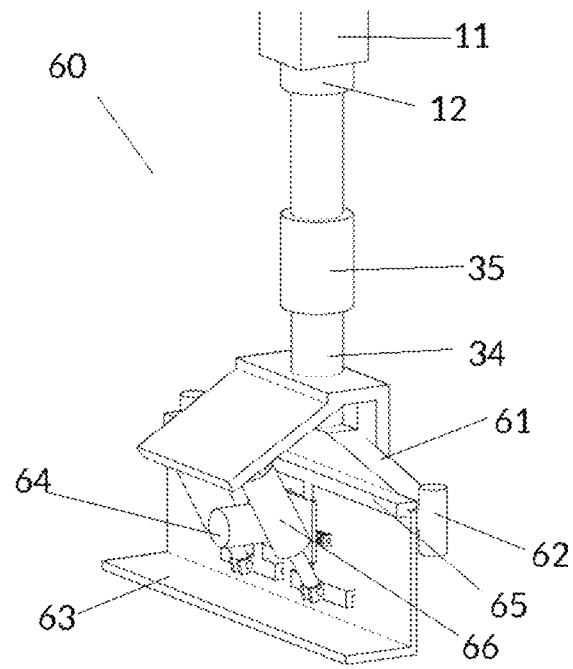
FIG. 21: It shows a perspective view of the levelling tool for horizontal surfaces.
Figure 22:
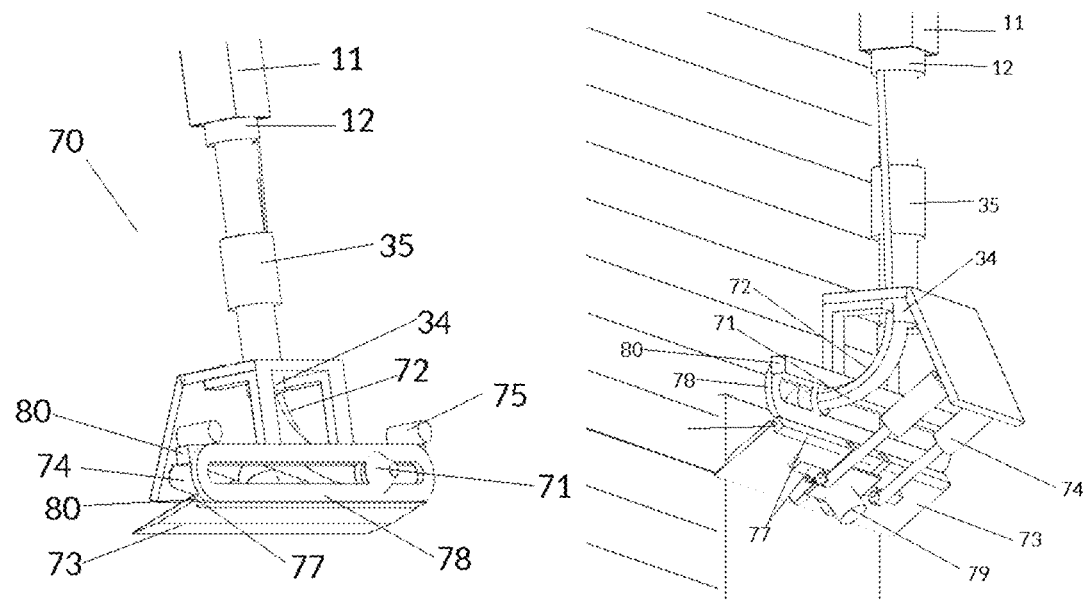
FIG. 22: It shows two perspective views of a levelling tool for vertical surfaces.
Figure 23:
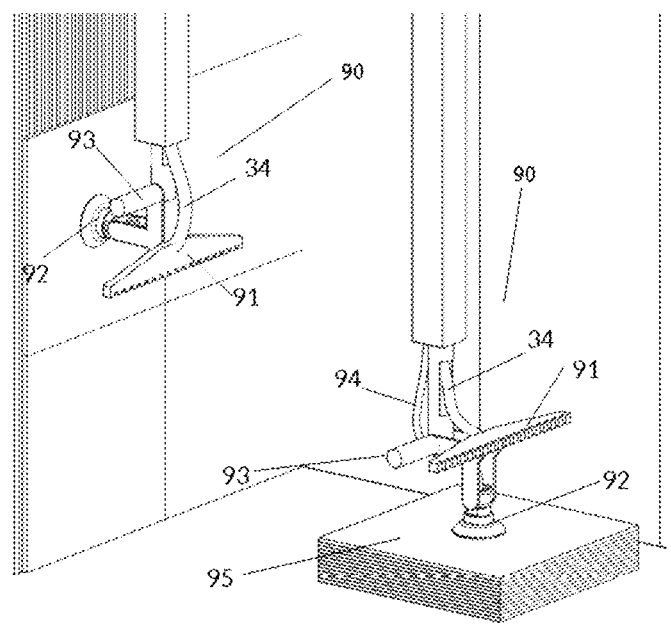
FIG. 23: It shows two perspective views of an adhesive extruder tool and handler.
Figure 24:
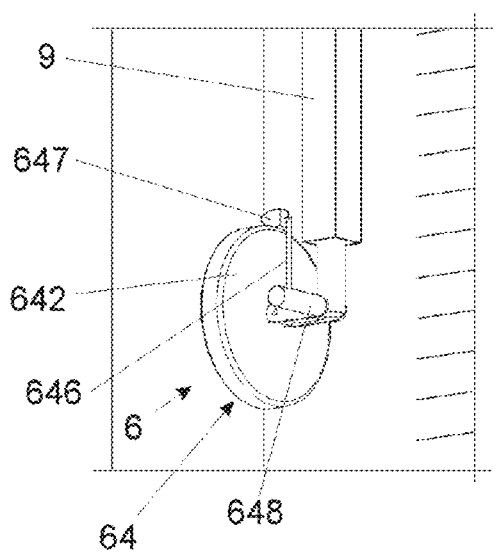
FIG. 24: It shows a perspective view of the finishing and polishing disk fabrication tool.
Figure 25:
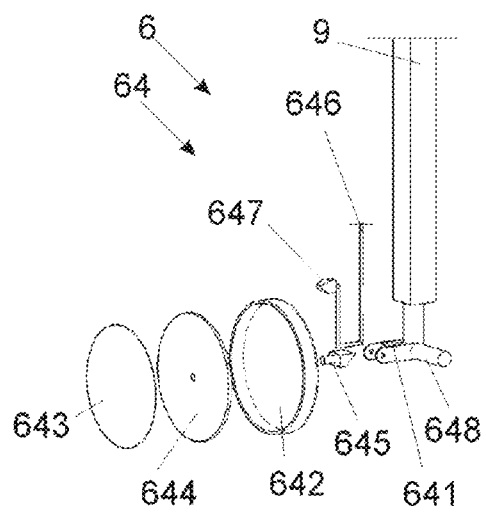
FIG. 25: It shows an exploded perspective view of the finishing and polishing disk fabrication tool.

The fabrication tool (3) can be provided with two or more nozzles (34) and each of them can deposit a different fluid material, for example, one cement-based and an acoustic or thermal insulating material, in addition one or more nozzles (34) can move on a horizontal plane with respect to the rest of the nozzles (34) fixed or mobile by means of electric motors (36) driven by the controller, to make, for example, the vertical element of the FIG. 14.

As a variant of the fabrication tool (3) with one or more nozzles (34) at the exit of one of the nozzles (34) a printing roller (36) can be provided that deposits layers having a determined design. The said roller comprises a structure (102) to which four concentric tubes are fastened (37) and that are arranged one within the other, two of them being rotatory. These tubes (37) possess on their surface a series of hollows that, when rotating and jointly with the injection of material, form a construction element.

Another variant of the fabrication tool (3) would be the one resulting from mixing the two preceding systems in a single device.

As another variant of tool, we have that, at the exit of one of the nozzles (34), a mold (38) can be provided to generate a solid construction element having a predetermined shape as the fluid is setting within it. Preferably, the said solid element is deposited in a predetermined position when its lower face (39) is opened and it is expelled by a pusher (40) driven, for example, by compressed air both driven by the controller. The mold (38) can be provided with a compacting and vibratory device, as well as being heated, for example, by induction to accelerate the setting of the fluid construction material. A variant of this tool would be to apply a light to the construction material introduced in the mold, in order it hardens and after it did it, depositing it in the position.

Likewise, on the overhanging arm (12), tools (3) can be installed for levelling horizontal or vertical surfaces, that can have a vibratory motion for compacting the material provided, tools for handling solid materials, disks for finishing and polishing surfaces, drills, or elongated nozzles for applying adhesives and facing plates, tools for handling prefabricated construction elements, such as beams or metal armors, necessary for forming structural elements.

With relation to the levelling tools it is thought convenient to quote and describe the tool levelling horizontal surfaces (60) and the tool levelling vertical surfaces (70):

The tool levelling horizontal surfaces is, in a preferred construction, of a collector (61) connected at the exit of the pipe (34) by which a fluid construction material that can be cement-based is carried, that allows that the construction material can homogenously go out and is deposited in the necessary position and quantity. The main pipe has a valve (35) installed, remotely controlled and synchronized with the main (31) and secondary pumps (33). This tool possesses depth sensors (62) installed for determining the distance of the tool up to the position or place where it will be deposited and sends this signal to the controller. Next to the collector (61) a rule (63) is installed that carries out, thanks to a mechanism of quick return (64), a longitudinal movement that makes that the material deposited can be, in addition to compacted, perfectly levelled. If necessary, it can include vibratory devices to increase its capacity of vibration, that can be insulated to avoid the transmission of vibrations to the rest of the invention.

The said rule (63) is fastened to the rest of the tool by means of lineal slides (65) that allow its longitudinal displacement, that are connected with the collector through an axis to allow the rotation with the structure of the tool by means of the action of two actuators (66).

The tool levelling vertical surfaces (70) is designed to carry out continuous coatings with different materials on wall facings. In a preferred construction, it consists of the guiding and the oscillating movement of one pipe (71) that releases a quantity of determined fluid construction material and that, connected to another pipe of compressed air (72), achieves to project it on the facing. The tool is provided in addition with a mobile, vibratory and articulated rule (73) that, thanks to pneumatic or electric actuators (74), guided by the controller, carries out the alignment of the material on the support. The tool is provided with sensors (75) for measuring the depth down to the support, in addition of a flowmeter at the exit of the pipes that send the signals to the controller for guiding the movement.

The supply or not of material and compressed air is carried out by means of valves driven by the controller.

Other fabrication tools are the adhesive extruder tool that allows depositing on a surface a determined quantity of adhesive to fix coatings, for example, ceramic coating on walls and grounds and the handling tool (90), that achieves picking up from the stock existing in a specific place, the material and apply it on the wall in the exact position and accurately. In a preferred embodiment these two tools become one and it comprises a nozzle (91) having a rectangular cross section and outlet grooves through which an adhesive material goes out and is deposited. The same tool has a suction type handler (92) installed that, by means of vacuum, achieves to pick up the material from the stock and apply it on the wall in the exact position and accurately using for it pressure sensors that guarantee to perfectly placing. The handler (92) and the nozzle (91) are oriented at 90 degrees to each other and by means of an electric motor (93) driven by the controller, rotates in order to locate the handler or nozzle facing the surface.

Another fabrication tool (3) comprises one or more nozzles (34) that feed a gun or mechanism for projecting the construction material on a support or on itself to generate new construction elements or depositing a layer on other existing ones as a coating of the surface.

Another fabrication tool (3) comprises in a finishing and polishing disk (64) which comprises a rotation motor (641) having high rpm that rotates a rigid supporting disk (644) to which a finishing disk (643) of different materials is coupled, that, in turn, are fastened on the axis of the motor (645) and allow to carry out polishing surfaces such as walls and grounds.

Preferably, the robotised construction system (1), comprises a protecting system against weathering that extends horizontally from a portico (8) to another in the direction of the bridge beam (9) and on both sides of each bridge beam (9) and that is extended and retracted depending on the movements of the bridge beam/s (9) to allow the free movement thereof and protect the working area of the robot against weathering. This system is designed in order that the waters coming from the rain are channeled outside the construction area.

The invention claimed is:

1. A robotised construction system comprising:
a cartesian robot (1), that in turn comprises:
two horizontal beams (8) located so that at least a part of a story of a construction is located between said two horizontal beams,
one or more bridge beams (9) arranged between said two horizontal beams (8) and designed to move along said two horizontal beams (8),
one or more carts (10) arranged on each of said one or more bridge beams (9) and designed to move along said one or more bridge beams (9),
one or more extendible columns (11), each of said one or more extendible columns (11) is coupled to one of said one or more carts (10),
one or more overhanging arms (12), each of said one or more overhanging arms (12) is provided with one or more degrees of freedom and is coupled to a column free end (11),
a plurality of actuators that move said one or more bridge beams (9), said one or more carts (10), said one or more overhanging arms (12), and extend or retract said one or more extendible columns (11),
a plurality of position sensors of said one or more bridge beams (9), said one or more carts (10) and said one or more overhanging arms (12),
a programmable controller that at least controls said plurality of actuators and receives data from said plurality of position sensors;
one or more fabrication tools (3), arranged on said one or more overhanging arms (12);
a device of electric supply (4); and
a device of simultaneous supply (5) of one or more fluid construction materials to said one or more fabrication tools (3).

2. The robotised construction system (1) according to claim 1, wherein said two horizontal beams (8), are supported on a set of columns (7) forming porticos (6).

3. The robotised construction system (1) according to claim 2, further comprising a lifting device (2) for said two horizontal beams (8) or for the porticos (6) of the said cartesian robot (1).

4. The robotised construction system (1) according to claim 3, wherein the lifting device (2) consists of extendible columns (7) that lift the whole of the porticos (6).

5. The robotised construction system (1) according to claim 3, wherein the lifting device (2) of the porticos (6) is provided with anchorages (14,15) to the construction.

6. The robotised construction system (1) according to claim 1, wherein at least one of the fabrication tools (3) of said one or more fabrication tools (3) comprises one or more nozzles (34) hydraulically connected to the supply device_ (5), coupled to said one or more overhanging arms (12) and designed to deposit layers of a fluid construction material one layer on the top of another layer generating vertical elements or one layer next to another layer generating horizontal elements.

7. The robotised construction system (1) according to claim 6, wherein each of the nozzles (34) of said one or more nozzles (34) is provided with an on/off valve (35) controlled by said controller.

8. The robotised construction system (1) according to claim 6, wherein at least one of the nozzles (34) of said one or more nozzles (34) is supplied by the supply device (5) with a fluid construction material different from the construction material that supplies the rest of the nozzles (34).

9. The robotised construction system (1) according to claim 6, wherein at least one of the nozzles (34) of said one or more nozzles (34) can be horizontally moved with respect to said one or more nozzles (34) by means of a motor (36) controlled by said controller.

10. The robotised construction system (1) according to claim 1, wherein at least one of the fabrication tools (3) comprises one or more nozzles (34) hydraulically connected to the supply device (5), coupled to the overhanging arm (12) and where said at least one of the fabrication tools (3) consists of a device for levelling at least one of horizontal (60) or vertical (70) surfaces that comprises at least a rule (63) through which the material goes out and is dispensed on at least one of the horizontal or the vertical surface.

11. The robotised construction system (1) according to claim 1, wherein at least one fabrication tool (3) of the said one or more fabrication tools (3) comprises one or more nozzles (34) that supply a gun or mechanism for projection of the one or more fluid construction materials on a support or on the construction materials itself to generate new construction elements or depositing a layer of the one or more fluid construction materials on already existing layers of previously deposited construction materials.

12. The robotised construction system (1) according to claim 2 further comprising, a protecting system against weathering that horizontally extends from the portico (6) to another portico (6) in the direction of the bridge beam (9) and on both sides of each bridge beam (9) and that is extended or retracted depending on the movements of the bridge beams (9) to allow the free movement thereof.

13. The robotised construction system (1) according to claim 1, wherein the bridge beam (9) has an extendible length to fit a variable distance between said two horizontal beams (8).

14. The robotised construction system (1) according to claim 1, wherein the simultaneous supply device (5) of one or more fluid construction materials to the fabrication tools (3) is one or more unmanned aerial vehicles provided with one or more tanks of construction material.

15. The robotised construction system (1) according to claim 1, wherein the supplying device (4 and 5) comprises a system through which a set of pipes (19) run, that is driven and controlled by said controller.

16. The robotised construction system (1) according to claim 7, wherein at least one of the nozzles (34) is supplied by the supply device (5) with a fluid construction material different from the construction material that supplies the rest of the nozzles (34).

17. The robotised construction system (1) according to claim 7, wherein at least one of the nozzles (34) of said one or more nozzles (34) can be horizontally moved with respect to said one or more nozzles (34) by means of a motor (36) controlled by said controller.

18. The robotised construction system (1) according to claim 8, wherein at least one of the nozzles (34) can be horizontally moved with respect to said one or more nozzles (34) by means of a motor (36) controlled by said controller.

* * * * *